US005951925A

United States Patent [19]

Mucciacciaro

[11] Patent Number: 5,951,925
[45] Date of Patent: Sep. 14, 1999

[54] PHOTOGRAPHIC REPRODUCTION BY MILLING

[76] Inventor: Dominic Mucciacciaro, 1791 Blount Rd., Suite 901, Pompano Beach, Fla. 33069

[21] Appl. No.: 08/842,522

[22] Filed: Apr. 24, 1997

[51] Int. Cl.$^{6}$ ........................ B29C 7/04

[52] U.S. Cl. ........................ 264/40.5; 264/40.1; 264/40.3; 356/378; 356/241; 356/372; 356/375

[58] Field of Search ........................ 356/378, 241, 356/372, 375, 396; 433/218, 223, 213, 214; 264/40.1, 40.3, 40.5

[56] References Cited

U.S. PATENT DOCUMENTS

| | | | |
|---|---|---|---|
| 3,726,994 | 4/1973 | Ross | 178/6.6 B |
| 4,939,379 | 7/1990 | Horn | 250/560 |
| 5,232,321 | 8/1993 | Suzuki | 409/107 |
| 5,364,491 | 11/1994 | Schneider | 356/378 |
| 5,382,164 | 1/1995 | Stern | 433/223 |
| 5,486,546 | 1/1996 | Mathiesen et al. | 522/165 |
| 5,549,476 | 8/1996 | Stern | 433/223 |

*Primary Examiner*—Merrick Dixon
*Attorney, Agent, or Firm*—Alvin S. Blum

[57] ABSTRACT

A rigid substrate with a first surface is provided with a graven image in that surface that is representative of a first image such as a photograph by a unique method that requires no artistic talent. The photograph is first scanned by an optical scanner to store reflected light values at multiple loci forming an X, Y grid on the photograph. The rigid substrate, such as an aluminum panel, is mounted on a bed of a computer controlled machine tool such as a milling machine. A conical drill bit drills a hole at each X, Y position or locus on the panel. The depth of the hole, drilled, or Z axis is determined by the value of reflected light stored from the optical scanning step. The depth may be directly or inversely proportional to the value. A factor applied to the X and Y values may reduce or enlarge the graven image relative to the first image. The diameter of the hole at the first surface will increase as the depth increases. The first surface may be optionally provided with a different appearance than the subsurface, such as by anodizing, to further enhance the image produced.

14 Claims, 2 Drawing Sheets

PHOTOGRAPHIC REPRODUCTION BY MILLING

BACKGROUND OF THE INVENTION

This invention relates to graven images and, more particularly, to graven images reproduced in rigid substrates by a process of first optically scanning an image to produce a two dimensional data field of pixels with each pixel datum representing amount of light at one point on the original image, and then using a conical end mill to drill into the solid substrate at depths related to the datum at each of the pixel locations on the substrate.

Woodcarvers, sculptors and ceramic craftsmen have been preparing relief sculptures representing images of real and imaginary figures since prehistoric times. They cut away portions of the surface of the substrate to various depths until the image stands out clearly. In modern times some of these processes have been facilitated by machine tools.

It generally requires the skill of a craftsman to effectively reproduce an image on a rigid substrate, even with the elegant and convenient machine tools and carving devices available today.

SUMMARY OF THE INVENTION

It is accordingly an object of the invention to provide a graven image on a rigid substrate that is a representation of another image by a method that reduces the artistic skill required by the operator.

The method includes first optically scanning the first image and storing values of light reflected from the image at particular loci and then drilling holes in the rigid substrate at corresponding loci in the solid substrate whose depth is directly or indirectly proportional to the amount of light received at the corresponding loci on the first image. By employing a conical drill, the diameter of the hole as well as the depth may be related to the light value to further enhance the graven image produced. To further enhance the image, the surface of the substrate may be provided with a different appearance than the subsurface that is exposed by the drilling process.

These and other objects, advantages and features of the invention will become more apparent when the detailed description is studied in conjunction with the drawings, in which like reference characters designate like elements in the various figures.

DETAILED DESCRIPTION OF PREFERRED EMBODIMENTS

Figure 1:
FIG. 1 is a photographic image that is to be reproduced by the method of the invention.
Figure 2:
FIG. 2 is a plan view of a black anodized aluminum panel on which the image of FIG. 1 has been formed by the method of the invention.
Figure 3:
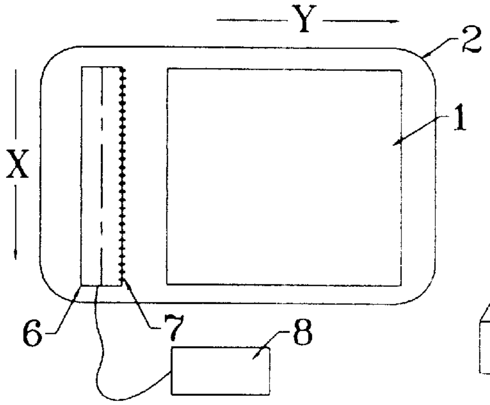
FIG. 3 is a diagrammatic representation of a flat bed optical scanner used for scanning the image of FIG. 1.
Figure 4:
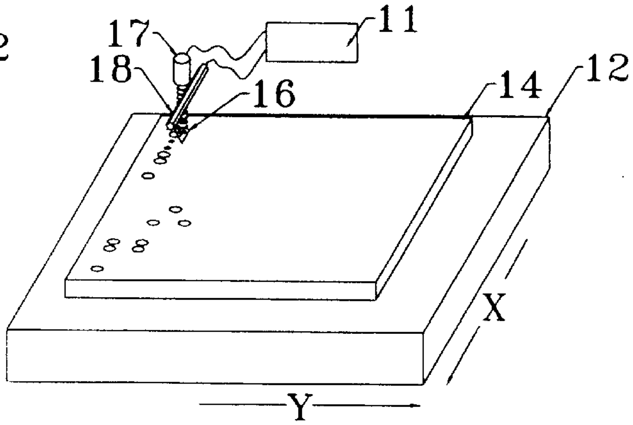
FIG. 4 is a diagrammatic representation of a machining center used for producing the graven image shown in FIG. 2.
Figure 5:
FIG. 5 is an enlarged detail of a portion of FIG. 1.

Referring now to FIGS. 1–7, a first image 1, such as for example, but not limited to, a photograph is optically scanned in a flat bed optical scanner 2 in two directions or dimensions X, Y. Conventional scanners well known in the art have a uniform light bar 6 and a linear array of light sensors 7, such as a charge coupled diode array (CCD) to sense the light reflected by the image along a first or X direction 3 at points or loci much closer together than is required for this function such as at 300 or 600 points per inch. The values of sensed light intensity for each point or locus is stored in a memory 8. The light bar 6 and sensor array 7 move along a second or Y direction 4, and the values sensed at closely spaced points are recorded in memory so that a gridwork of locus values with a resolution of 300×300 or 600×600 points per inch is recorded along X and Y directions. These values may be employed in a computer for reproducing a high resolution image of the scanned object.

Figure 6:
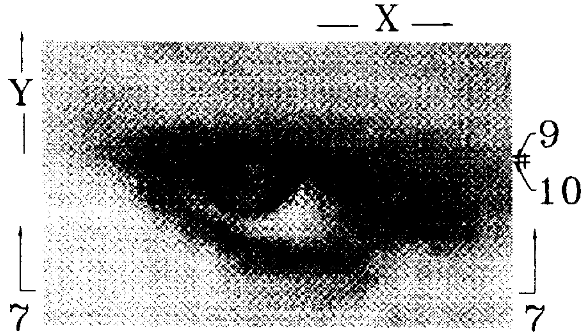
FIG. 6 is an enlarged detail of a portion of FIG. 2 corresponding to the area of FIG. 5.
Figure 7:
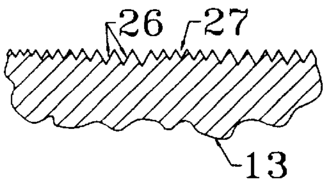
FIG. 7 is a sectional view through line 7—7 of FIG. 6.

For the purposes of this invention, a much coarser resolution is employed, and values may be selected from the memory 8 at 0.1 inch intervals, for example along both X and Y directions. The grid 9 of FIG. 6 illustrates the resolution used with each intersection 10 representing a locus on the first image for which a reflected light intensity value is employed in the method of the invention. The values associated with these loci and their X, Y positions are stored in a computer 11 of a machine tool 12 such as a numerically controlled milling machine, lathe or machining center well known in the art. A program also stored in the computer 11 directs the machine tool to operate on a rigid substrate 13 having a first surface 14. In this case, the first surface 14 is coplanar with the flat horizontal movable bed 15 of machine tool 12. The bed 15 is movable through X and Y axes under control of computer 11. If the surface 14 is not coplanar, it may be made so by conventional milling operation. A conical drill bit 16 is rotatably driven by driver 17 and is moved up and down along the Z axis by Z mover 18 under computer control. The program stored in computer 11 causes the machine to move the substrate 13 so that each locus is positioned beneath the drill bit in turn and the bit then drills down through the surface a distance Z that is proportional, either directly or indirectly, to the value representing the amount of light reflected from the corresponding locus on the photograph. The X, Y values may be modified by factors to enlarge or reduce the graven image. The proportionality between the Z value and the light value may be linear or non-linear to thereby modify the graven image. This may also be achieved by changing the shape of the taper from straight to curvilinear. The substrate may be any rigid material that can be effectively drilled with cutting or grinding tools such as metal, stone, plastic and the like. The light and dark areas on the image 1 are converted into large diameter deep holes 10 or small shallow holes 27 that effectively represent the image and give a three dimensional effect.

Figure 8:
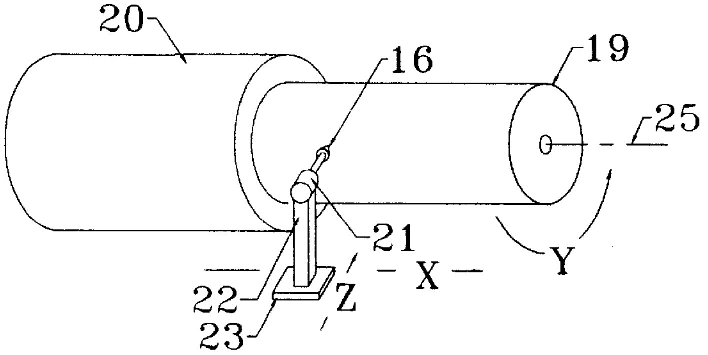
FIG. 8 is a diagrammatic representation of a machining center useful for producing the graven image on a non-planar surface.

As shown in FIG. 8, a non-planar first surface, such as a rigid substrate with a cylindrical surface 19 may be employed in the invention using a machine 20 by driving a rotating conical bit 16 with motor 21 supported on tool post 22. The cross drive 23 supporting the tool post moves the bit 16 through the Z axis. The tool post is driven along an axis 24 parallel to the axis 25 of the workpiece to provide the X axis. The workpiece is rotated about the axis 25 to provide the Y axis. To further enhance the appearance of the finished graven image, the first surface may be provided with a different appearance than the subsurface that is exposed by the drilling process. It may have a different color, such as an anodized surface on aluminum. It may have a different texture, such as a matte finish on stone.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A method for producing a graven image in a rigid substrate that is representative of a first image, the method comprising the steps of:

A) optically scanning a first image in two dimensions;

B) storing a record of said optical scanning in the form of a plurality of stored values, each value being representative of the amount of light emanating from the first image at a particular locus on the first image (pixel);

C) providing a rigid substrate having a first surface to be graven with a second image that is representative of said first image; and D) drilling into said first surface a plurality of individual holes, one for each of said stored values, at locations on said first surface representative of the locations of the pixels in said first image, and in which each hole is drilled to a depth either directly or inversely proportional to the magnitude of the stored value.

2. The method according to claim 1, in which the plurality of holes are drilled with means for drilling tapered holes so that the diameter of the hole at said first surface is proportional to the depth of the hole.

3. The method according to claim 2, in which the depth of the hole drilled is directly proportional to the magnitude of the stored value.

4. The method according to claim 2, in which the depth of the hole drilled is inversely proportional to magnitude of the stored value.

5. The method according to claim 4, in which the surface of the rigid substrate is of a different appearance than the subsurface thereof.

6. The method according to claim 3, in which the surface of the rigid substrate is of a different appearance than the subsurface thereof.

7. A rigid substrate having a graven image on a first surface that is representative of a first image, the graven image having been produced by the method comprising the steps of:

A) optically scanning a first image in two dimensions;

B) storing a record of said optical scanning in the form of a plurality of values, each value being representative of the amount of light emanating from the first image at a particular locus on the first image or picture element (pixel);

C) providing a rigid substrate having a first surface to be graven with a second image that is representative of said first image; and D) drilling into said first surface a plurality of individual holes, one for each stored value, at locations on said first surface representative of the locations of the pixels in said first image, and in which each hole is drilled to a depth either directly or inversely proportional to the magnitude of the stored value.

8. The graven image according to claim 7, in which the plurality of holes are drilled with means for drilling tapered holes so that the diameter of the hole at said first surface is proportional to the depth of the hole.

9. The graven image according to claim 8, in which the depth of the hole drilled is directly proportional to the magnitude of the stored value.

10. The graven image according to claim 8, in which the depth of the hole drilled is inversely proportional to magnitude of the stored value.

11. The graven image according to claim 10, in which the surface of the rigid substrate is of a different appearance than the subsurface thereof.

12. The graven image according to claim 9, in which the surface of the rigid substrate is of a different appearance than the subsurface thereof.

13. The method of claim 1, in which the surface of the rigid substrate is of a different appearance than the subsurface thereof.

14. The graven image according to claim 7, in which the surface of the rigid substrate has a different appearance than the subsurface thereof.

* * * * *